(12) United States Patent
Liu

(10) Patent No.: US 9,152,265 B2
(45) Date of Patent: Oct. 6, 2015

(54) TOUCH SENSITIVE DISPLAY

(75) Inventor: Chen-Yu Liu, Jhongli (TW)

(73) Assignee: TPK Touch Solutions Inc., Taipei (TW)

( * ) Notice: Subject to any disclaimer, the term of this patent is extended or adjusted under 35 U.S.C. 154(b) by 416 days.

(21) Appl. No.: 13/414,722

(22) Filed: Mar. 8, 2012

(65) Prior Publication Data

US 2013/0027325 A1 Jan. 31, 2013

(30) Foreign Application Priority Data

Jul. 28, 2011 (TW) .............................. 100126712 A

(51) Int. Cl.
G06F 3/041 (2006.01)
G06F 3/044 (2006.01)

(52) U.S. Cl.
CPC .............. *G06F 3/0412* (2013.01); *G06F 3/044* (2013.01); *G06F 2203/04107* (2013.01)

(58) Field of Classification Search
CPC ........... G02B 5/23; G02F 1/00; G06F 3/0488; G06F 3/0412; G06F 3/044; G06F 2203/04107
USPC ........................................................ 345/173
See application file for complete search history.

(56) References Cited

U.S. PATENT DOCUMENTS

| 2005/0012699 A1* | 1/2005 | Lee et al. .......................... 345/87 |
| 2007/0242055 A1* | 10/2007 | Lai ................... 345/173 |
| 2008/0062139 A1* | 3/2008 | Hotelling et al. .............. 345/173 |
| 2008/0276976 A1* | 11/2008 | Buller et al. ................. 134/56 D |
| 2010/0110041 A1* | 5/2010 | Jang ............................... 345/174 |
| 2010/0134448 A1* | 6/2010 | Park et al. ...................... 345/176 |
| 2010/0289774 A1* | 11/2010 | Pan et al. ....................... 345/175 |
| 2011/0285640 A1* | 11/2011 | Park et al. ..................... 345/173 |
| 2012/0235928 A1* | 9/2012 | Chang et al. ................... 345/173 |
| 2013/0044074 A1* | 2/2013 | Park et al. ...................... 345/174 |

FOREIGN PATENT DOCUMENTS

| CN | 20121887 | 4/2009 |
| TW | 220240 | 8/2004 |

\* cited by examiner

*Primary Examiner* — Aneeta Yodichkas

(74) *Attorney, Agent, or Firm* — Gokalp Bayramoglu

(57) ABSTRACT

A touch sensitive display includes: an upper substrate, a lower substrate, an organic light-emitting component, and a touch sensing component. The lower substrate is disposed below the upper substrate and the organic light-emitting component is disposed above the lower substrate. The touch sensing component designed by a single layer structure is disposed under or above the upper substrate. Therefore, the present invention can achieve the purpose of lightening the touch sensitive display and simplifying manufacturing process of the touch sensitive display.

32 Claims, 12 Drawing Sheets

TOUCH SENSITIVE DISPLAY

This application claims the benefit of Taiwan application No. 100126712, filed on Jul. 28, 2011.

BACKGROUND

1. Technical Field

The present invention relates to a display device, and more particularly relates to an organic light-emitting display integrated with touch technology.

2. Description of the Related Art

Flat panel displays and touch panels have been popularized and widely used, and have also replaced the traditional video output devices (e.g.: Cathode Ray Tube (CRT)) and the physical keystroke devices (e.g.: keyboard, mouse, etc).

In terms of flat panel displays, liquid crystal displays (LCD) are in the main stream at present but there still exist a lot of problems in displaying characters in such displays. More and more manufacturers have begun spending time and effort in doing research and making development in organic light-emitting display (OLED). In an OLED structure, there is no need to have a backlight source, and the OLED is mainly formed by organic material coating and glass substrate. The organic material radiates light by itself when an electric current is passed through. Therefore, OLEDs have a lot of advantages when compared to LCDs as they are lighter, smaller, more sensitive, larger in visible angle, and more flexible.

In reference to integration of an OLED with a touch panel, FIG. 1 shows a schematic structure view of a traditional touch sensitive display. As shown, a touch sensitive display 9 comprises a touch panel 91 and an organic light-emitting display 92. The touch panel 91 is directly pasted on the organic light-emitting display 92. Typically, the touch panel 91 such as a capacitive touch panel comprises a touch substrate 911, a first transparent conducting layer 912, and a second transparent conducting layer 913. The first transparent conducting layer 912 and the second transparent conducting layer 913 are respectively formed on both sides of the touch substrate 911 (while in fact, they can be formed on the same side) for sensing touch signals.

The organic light-emitting display 92 comprises an upper substrate 921, a lower substrate 922, and a light-emitting component 923. The light-emitting component 923 is stacked on the lower substrate 922, and the organic light-emitting component 923 further comprises a pixel electrode layer 9231, an intermediate layer 9232, and a counter electrode layer 9233, and then the intermediate layer 9232 further comprises an electron injecting layer, an electron transporting layer, an organic light-emitting layer, a hole transporting layer, and a hole injecting layer. Moreover, the upper substrate 921 is disposed on the organic light-emitting component 923 and the touch panel 91 is disposed on the upper substrate 921 by a laminating process, forming the touch sensitive display 9.

As a result of the above description, volume and thickness of the touch sensitive display having an integration of a touch panel and an organic light-emitting display, increases. In addition, because it is necessary to conduct lamination after manufacturing both the touch panel and the organic light-emitting display separately, complicated manufacturing process is required. Therefore, there is still further space for the improvement of the design of the present touch sensitive display.

SUMMARY OF THE INVENTION

The present disclosure improves the structure of a touch sensitive display by integrating a single layer structure of capacitive touch sensing component that has been designed into an organic light-emitting display, to efficiently make the touch sensitive display light and simplify the manufacturing process of the touch sensitive display.

One embodiment of the present disclosure provides a touch sensitive display comprising an upper substrate, a lower substrate, an organic light-emitting component, and a touch sensing component. The lower substrate is disposed below the upper substrate and the organic light-emitting component is disposed above the lower substrate. The touch sensing component, designed by a single layer structure is disposed under the upper substrate.

Another embodiment of the present disclosure provides a touch sensitive display comprising an upper substrate, a lower substrate, an organic light-emitting component, and a touch sensing component. The lower substrate is disposed below the upper substrate and the organic light-emitting component is disposed above the lower substrate. The touch sensing component, designed by a single layer structure is disposed above the upper substrate.

Therefore, the effects that can be achieved by the present disclosure are, to make the touch sensitive display become lighter after integration, so that it is easier and more convenient for the present disclosure to apply in every aspect. Furthermore, the present disclosure efficiently simplifies the whole manufacturing process of touch sensitive display, thereby reducing the production cost.

The above as well as the following description and the attached drawings are all provided to further illustrate techniques and means that the present disclosure takes for achieving the prescribed objectives together with the effects of the present disclosure.

DETAILED DESCRIPTION OF THE PREFERRED EMBODIMENTS

The present invention integrates single layer structure of a touch sensing component that has been designed into an organic light-emitting display (OLED), to provide a touch sensitive display with slim and thin structure after integration with functions of image output and touch input. The OLED mentioned by the present disclosure can be roughly separated into an active matrix (namely AM-OLED) and a passive matrix (namely PM-OLED) depending on the driving methods. In addition, the pixel structural pattern of the OLED can be arranged into different structures, which are not limited by the present disclosure.

The terms "upper" and "lower", "above" and "under" referred in this specification are only used for showing relative relationship of position. For the drawings of this specification, upper side of touch sensitive display is closer to the viewer, and lower side is further from the viewer.

Figure 2:
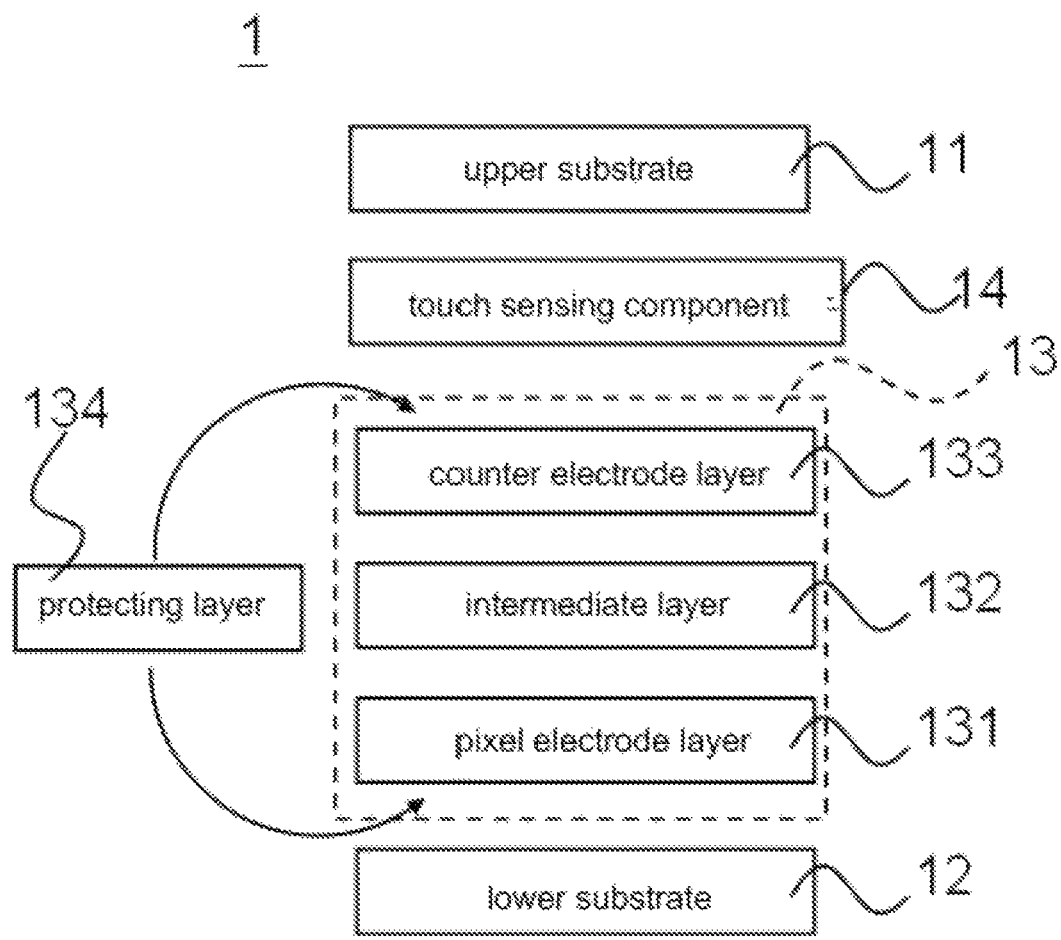
FIG. 2 is a schematic structure view of a touch sensitive display according to a first embodiment of the present invention.

Referring to FIG. 2, a schematic structure view of a touch sensitive display 1 according to a first embodiment of the present disclosure is shown. As depicted, a touch sensitive display 1 of the present embodiment comprises an upper substrate 11, a lower substrate 12, an organic light-emitting component 13, and a touch sensing component 14. Herein, the upper substrate 11 and the lower substrate 12 are corresponding to each other, and are respectively used for bearing the touch sensing component 14 and the organic light-emitting component 13. In addition, as to the materials, the upper substrate 11 and the lower substrate 12 can be, for example, respectively designed in glass and plastic, etc.

In an embodiment, the organic light-emitting component 13 is disposed above the lower substrate 12, and further comprises a pixel electrode layer 131, an intermediate layer 132, and a counter electrode layer 133. The pixel electrode layer 131 can be made from transparent conducting materials, such as tin indium oxide (ITO), and has been disposed above the lower substrate 12. The intermediate layer 132 is disposed above the pixel electrode layer 131, and includes, but not limited to, a stacked combination of electron injecting layer, electron transporting layer, organic light-emitting layer, hole transporting layer, and hole injecting layer (not shown in drawing), and intermediate layer can also be stacked depending on the design, not only on the above mentioned combination. In addition, the intermediate layer 132 is used for making the organic light-emitting component 13 spontaneously emit a white light, a red-green-blue color light, or a blue light according to the materials of the organic light-emitting layer. Moreover, the counter electrode layer 133 can be a metal electrode, such as silver, magnesium, or calcium, which is further disposed above the intermediate layer 132. From the overall structure, the pixel electrode layer 131, the intermediate layer 132 and the counter electrode layer 133 are stacked sequentially on the lower substrate 12 in a bottom-up order.

Referring to FIG. 2, the organic light-emitting component 13 can further comprise of a protecting layer 134 for disposing above the counter electrode layer 133 and/or further disposing between the pixel electrode layer 131 and the lower substrate 12. For this reason, the protecting layer 134 raises reliability of the organic light-emitting component 13 and achieves the effect of planarization.

The touch sensing component 14 is disposed under the upper substrate 11. The touch sensing component 14 can be, for example, designed as a capacitive touch sensing component, and designed with a single layer structure to achieve the function of sensing the touch signal. Please refer to FIG. 3A, where a schematic single layer structure view of one embodiment of a touch sensing component according to the present disclosure is shown. As depicted, the touch sensing component 14A comprises a plurality of sensing electrodes 141 which are juxtaposed and mutually spaced, and one terminal of each sensing electrode 141 is connected to a wire 142 which is further electrically connected to a control unit (not shown).

As the sensing electrodes 141 in the present embodiment are arranged in a vertical order, each sensing electrode 141 represents coordinate unit of X axis. When the user touches the touch sensitive display 1 or forms a touch point, the control unit senses the change in capacitance of the sensing electrodes 141 that are covered by the touch point, and then uses interpolation to calculate X coordinate of the touch point based on the capacitance change in the sensing electrodes 141. On the other hand, as each sensing electrode 141 is of trapezoid design, capacitance of each sensing electrode 141 shows linearity changes based on difference in up and down areas of trapezoid (representing Y axis). Therefore, after the control unit senses capacitance in electrodes 141 that are covered by the touch point, the control unit uses interpolation to calculate the Y coordinate of the touch point based on the linearity capacitance change in the sensing electrodes 141.

Figure 3A:
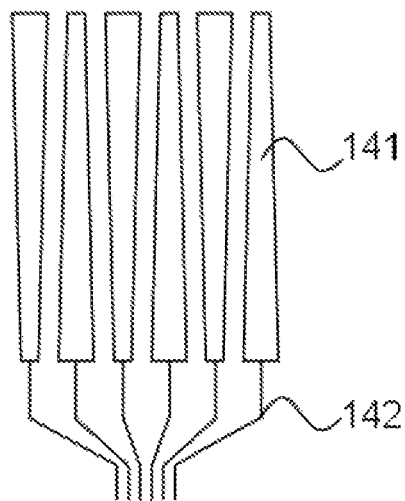
FIG. 3A is a schematic single layer structure view of one embodiment of a touch sensing component according to the present invention.
Figure 3B:
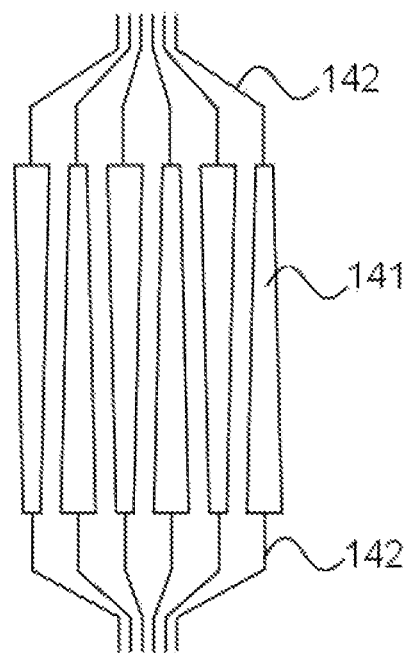
FIG. 3B is a schematic single layer structure view of another embodiment of the touch sensing component according to the present invention.

Please refer to FIG. 3B at the same time, wherein a schematic single layer structure view of another embodiment of the touch sensing component according to the present disclosure is shown. Structure of the touch sensing component 14B is similar to the structure of the touch sensing component 14A, with the difference being that both terminals of each sensing electrode 141 in FIG. 3B are electrically connected to a wire 142 respectively, which is further electrically connected to a control unit (not shown).

Calculation of X coordinate of a touch point in the embodiment of FIG. 3B is also similar to the computation as discloses for FIG. 3A. However, as to the calculation of Y coordinate of the touch point, because both terminals of each sensing electrode 141 are electrically connected to the wire 142, when the touch point appears, both terminals of the sensing electrode 141 that are covered by the touch point produce different impedance values due to respective different distances from the touch point and therefore both terminals of the sensing electrode 141 have different capacitances. As a result, the control unit is able to use interpolation to calculate the Y coordinate of the touch point based on capacitances of both terminals of the sensing electrode 141.

Further, as coordinate calculation method of the embodiment illustrated through FIG. 3B is on the basis of different capacitances of both terminals of the sensing electrode 141, in practical design, this type of sensing electrode 141 in FIG. 3B can also be designed as rectangle directly.

Figure 4:
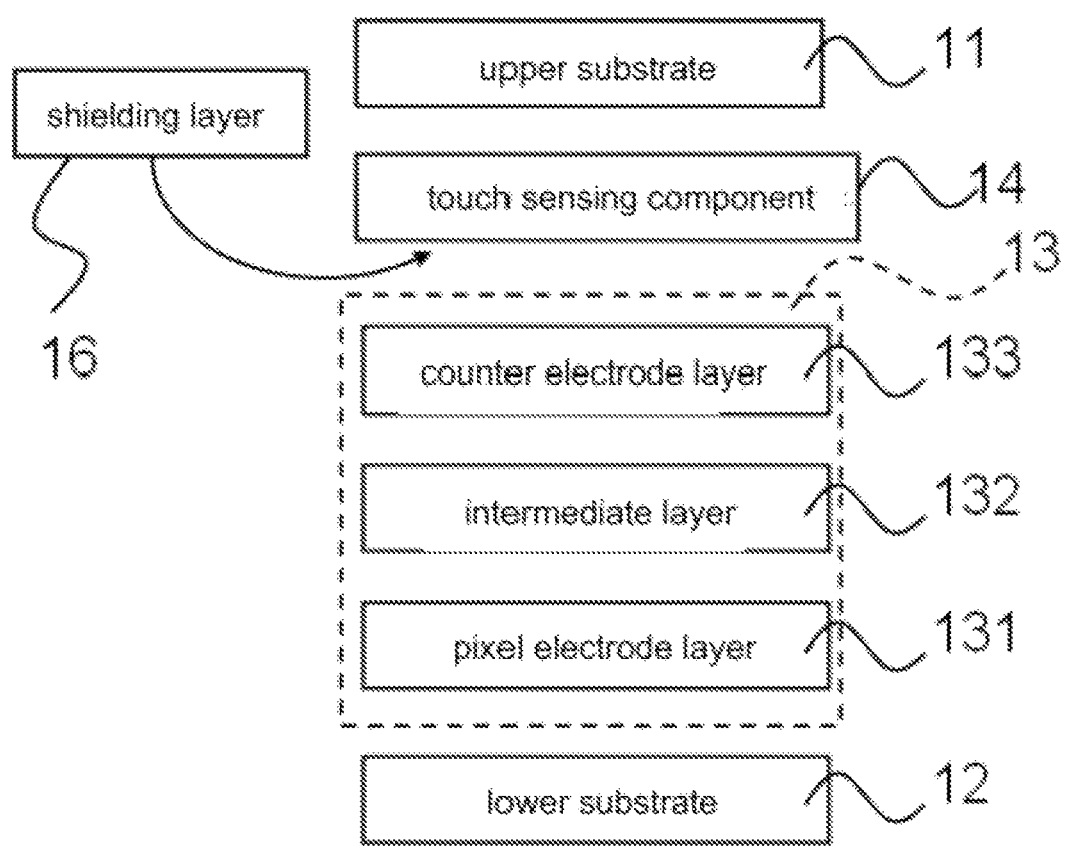
FIG. 4 is a schematic structure view of the touch sensitive display with a shielding layer according to the first embodiment of the present invention.

FIG. 4 shows a schematic structure view of a touch sensitive display 1A with a shielding layer 16 according to the first embodiment of the present disclosure. As depicted, the touch sensitive display 1A of the present embodiment further comprises a shielding layer 16 in addition to the basic structure as shown in the embodiment of FIG. 2. As to the structure, the shielding layer 16 is disposed under the touch sensing component 14 for shielding off noises coining from organic light-emitting component 13 to avoid influencing operation of the touch sensing component 14. Those skilled in the art would understand that the shielding layer 16 and the touch sensing component 14 are both made from metal materials, hence, the shielding layer 16 can further be laminated on the lower side of the touch sensing component 14 by an insulation material (not shown) in the practical design.

Figure 5:
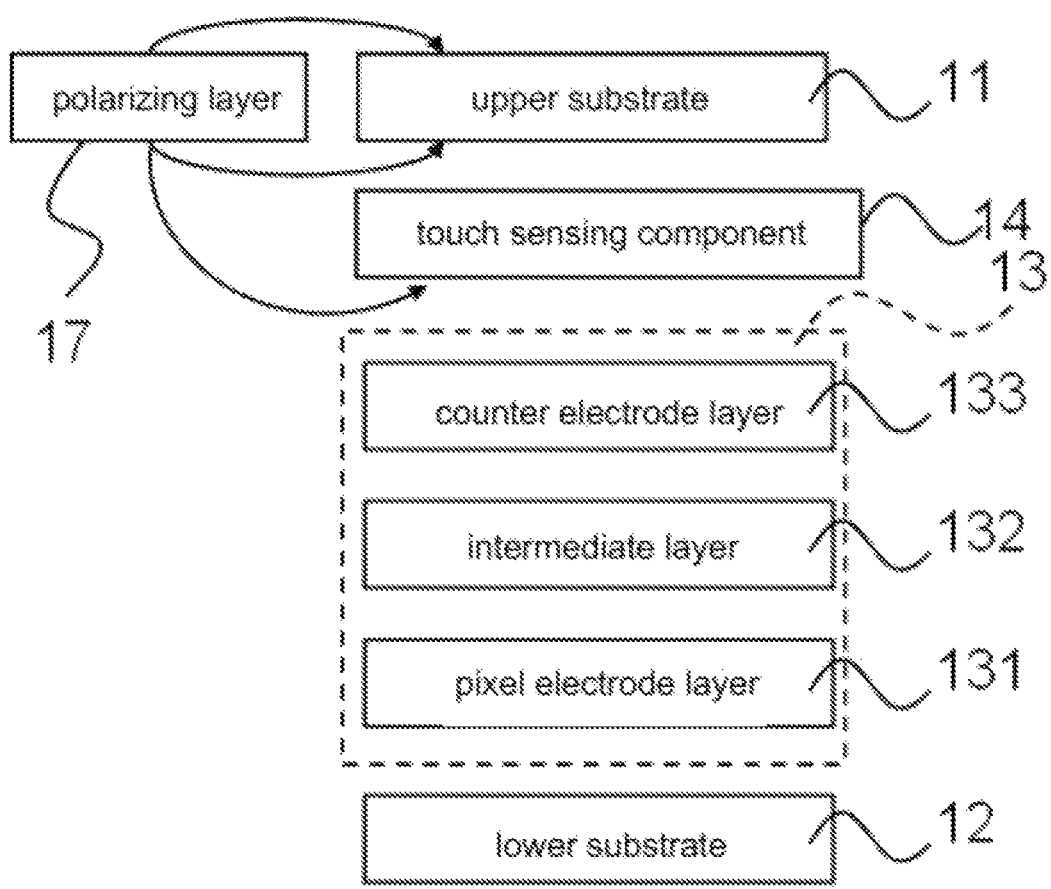
FIG. 5 is a schematic structure view of the touch sensitive display with a polarizing layer according to the first embodiment of the present invention.

FIG. 5 shows a schematic structure view of a touch sensitive display 1B with a polarizing layer 17 according to the first embodiment of the present disclosure. As depicted, the touch sensitive display 1B of the present embodiment further comprises a polarizing layer 17 in addition to the basic structure shown in the embodiment of FIG. 2 for increasing the contrast of organic light-emitting component 13. In structure, the polarizing layer 17 can be stacked either directly on the upper side of the upper substrate 11, or can be disposed between the upper substrate 11 and the touch sensing component 14, or can be stacked on the lower side of the touch sensing component 14.

Additionally, in order to respond to the request of practical design, the polarizing layer 17 can be collocated with a retardation film (not shown) for better implementation. Moreover, the retardation film can be mutually laminated with the polarizing layer 17 by external lamination method. Otherwise, the retardation film can also be directly integrated into the polarizing layer 17, which isn't limited herein.

Figure 6:
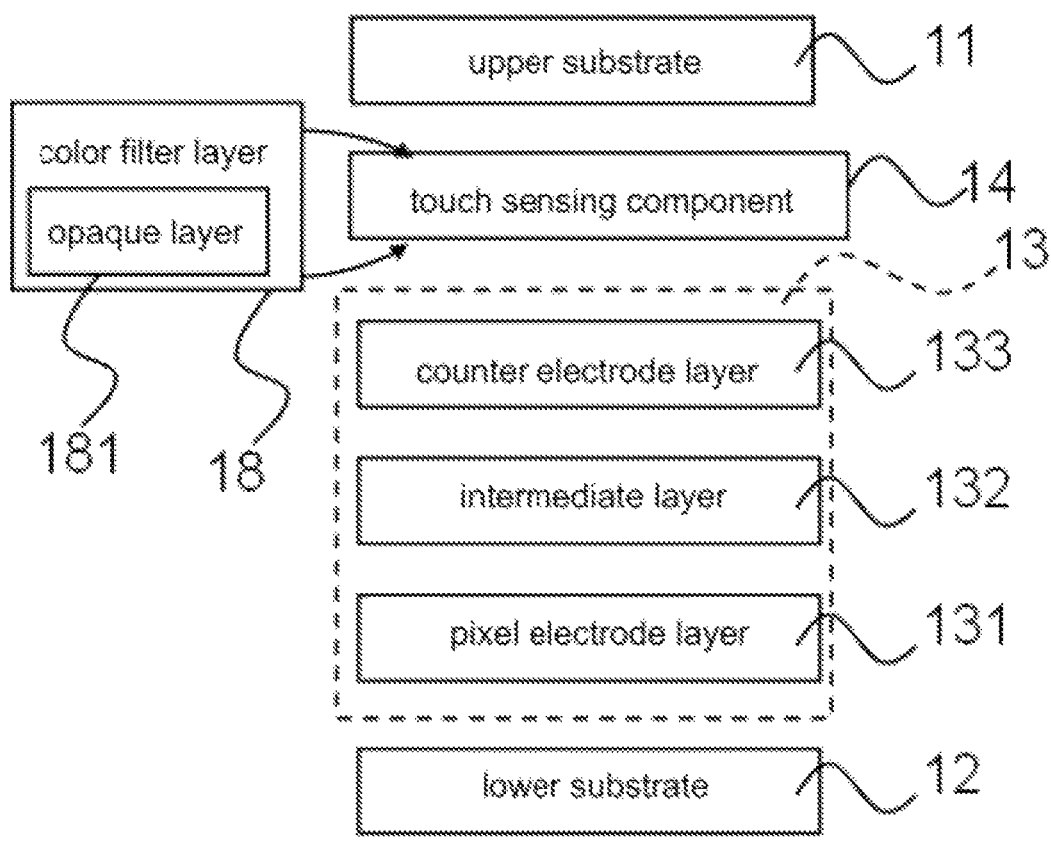
FIG. 6 is a schematic structure view of the touch sensitive display with a color filter layer according to the first embodiment of the present invention.

FIG. 6 shows a schematic structure view of a touch sensitive display 1C with a color filter layer 18 according to the first embodiment of the present disclosure. In an embodiment, if intermediate layer 132 of organic light-emitting component 13 is made from materials that make the organic light-emitting component 13 spontaneously emit white light, the touch sensitive display 1C can include a color filter layer 18 to let the white light go though the color filter layer 18 such that the white light is transformed into three basic color lights (red, green and blue) for achieving the display effect of colorizing.

In structure, the color filter layer 18 can either be disposed under the touch sensing component 14, or can be disposed between the touch sensing component 14 and the upper substrate 11.

Furthermore, the touch sensitive display 1C is shown in more detail in FIG. 6; wherein, an opaque layer 181 is built in the color filter layer 18 for differentiating the three basic color lights as mentioned above to avoid light leakage of each basic color light, to avoid color blending, to purify the three independent basic color lights, and also to prettify outward appearance of the touch sensitive display 1C. In an embodiment, the opaque layer 181 can be built within the touch sensing component 14 to achieve desired effects of differentiability and shielding off lights in the same manner.

Figure 7:
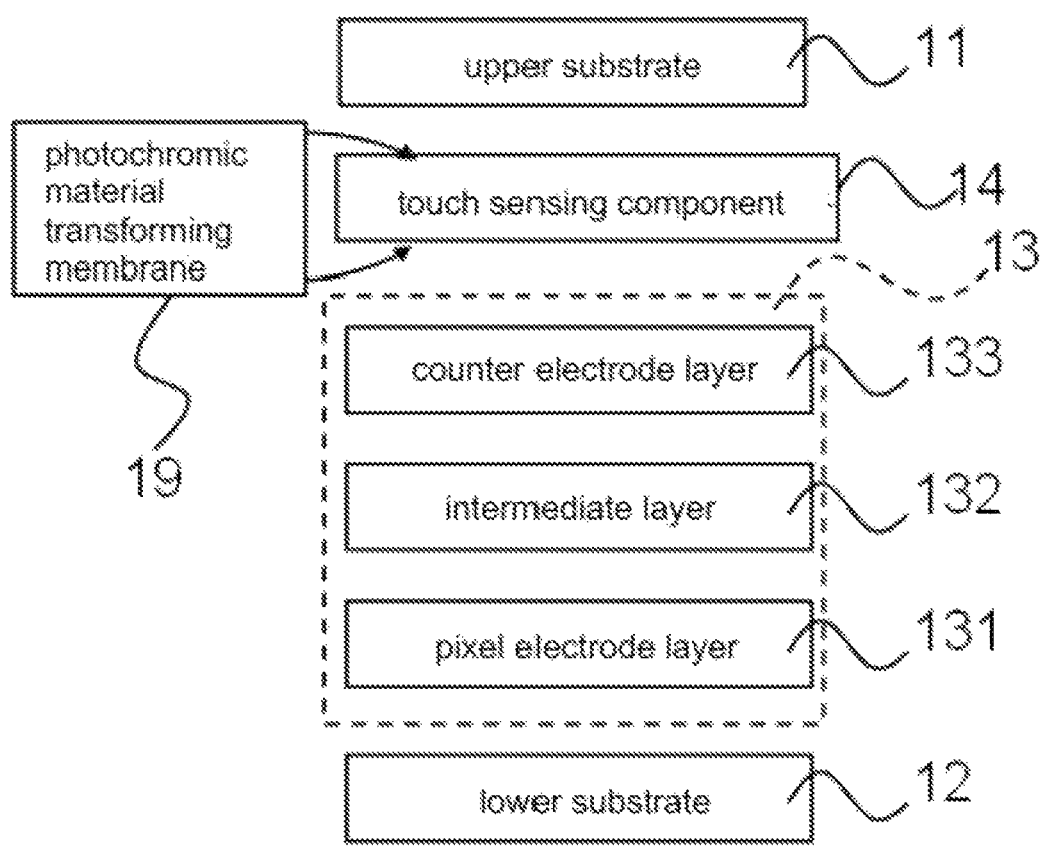
FIG. 7 is a schematic structure view of the touch sensitive display with a photochromic material transforming membrane according to the first embodiment of the present invention.

FIG. 7 shows a schematic structure view of a touch sensitive display 1D with a photochromic material transforming membrane 19 according to the first embodiment of the present disclosure. As depicted in FIG. 7, the present embodiment is different from the embodiment of FIG. 6, wherein in FIG. 7 intermediate layer 132 of organic light-emitting component 13 is made from materials that can make the organic light-emitting component 13 spontaneously emit blue light. The touch sensitive display 1D further comprises a photochromic material transforming membrane 19 to let the blue light go through the photochromic material transforming membrane 19, wherein the blue light is transformed into red and green lights through the configuration of different materials of the photochromic material transforming membrane 19 so as to achieve the display effect of colorizing.

In structure, the photochromic material transforming membrane 19 can either be disposed under the touch sensing component 14, or can be disposed between the touch sensing component 14 and the lower side of the upper substrate 11.

It would be appreciated that the embodiments as illustrated in FIGS. 4-7 are designed based on the main proposed structure of the present disclosure. In view of the functions and stack foundations of shielding layer 16, polarizing layer 17, color filter layer 18, and photochromic material transforming membrane 19, those skilled in the art can understand that if organic light-emitting component 13 is designed for spontaneous emission of the three colors color light (red, green and blue), it can selectively integrate the shielding layer 16 and the polarizing layer 17 within the touch sensitive display 1. Further, if the organic light-emitting component 13 is designed for spontaneous emission of the white light, it can selectively integrate the shielding layer 16, the polarizing layer 17, and the color filter layer 18 into the touch sensitive display 1. Furthermore, if the organic light-emitting component 13 is designed for spontaneous emission of the blue light, it can selectively integrate the shielding layer 16, the polarizing layer 17, and the photochromic material transforming membrane 19 into the touch sensitive display 1. Any other possible combination of layers described herein would also be incorporated under the scope of the present disclosure.

Figure 8:
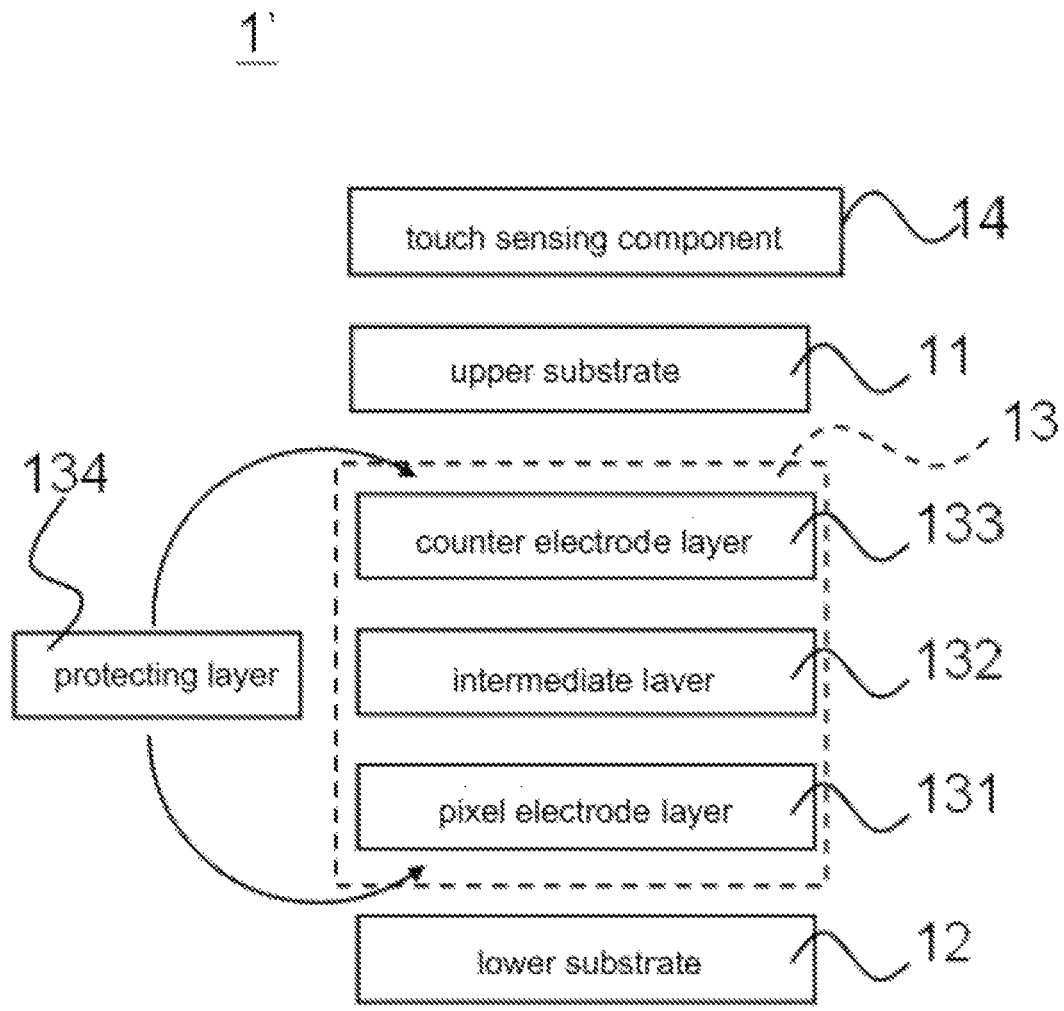
FIG. 8 is a schematic structure view of the touch sensitive display according to a second embodiment of the present invention.

FIG. 8 shows a schematic structure view of the touch sensitive display 1' according to another embodiment of the present disclosure. As depicted, structure of the touch sensitive display 1' cited by the present embodiment is similar to the structure of the touch sensitive display 1 that is shown in FIG. 2 with the difference being that the touch sensing component 14 of the touch sensitive display 1' of the present embodiment is disposed above the upper substrate 11.

In the embodiment illustrated through FIG. 8, all functions described earlier and relating to shielding layer 16, polarizing layer 17, color filter layer 18, and photochromic material transforming membrane 19 are same. Therefore, the following descriptions will explain the structure only.

Figure 1:
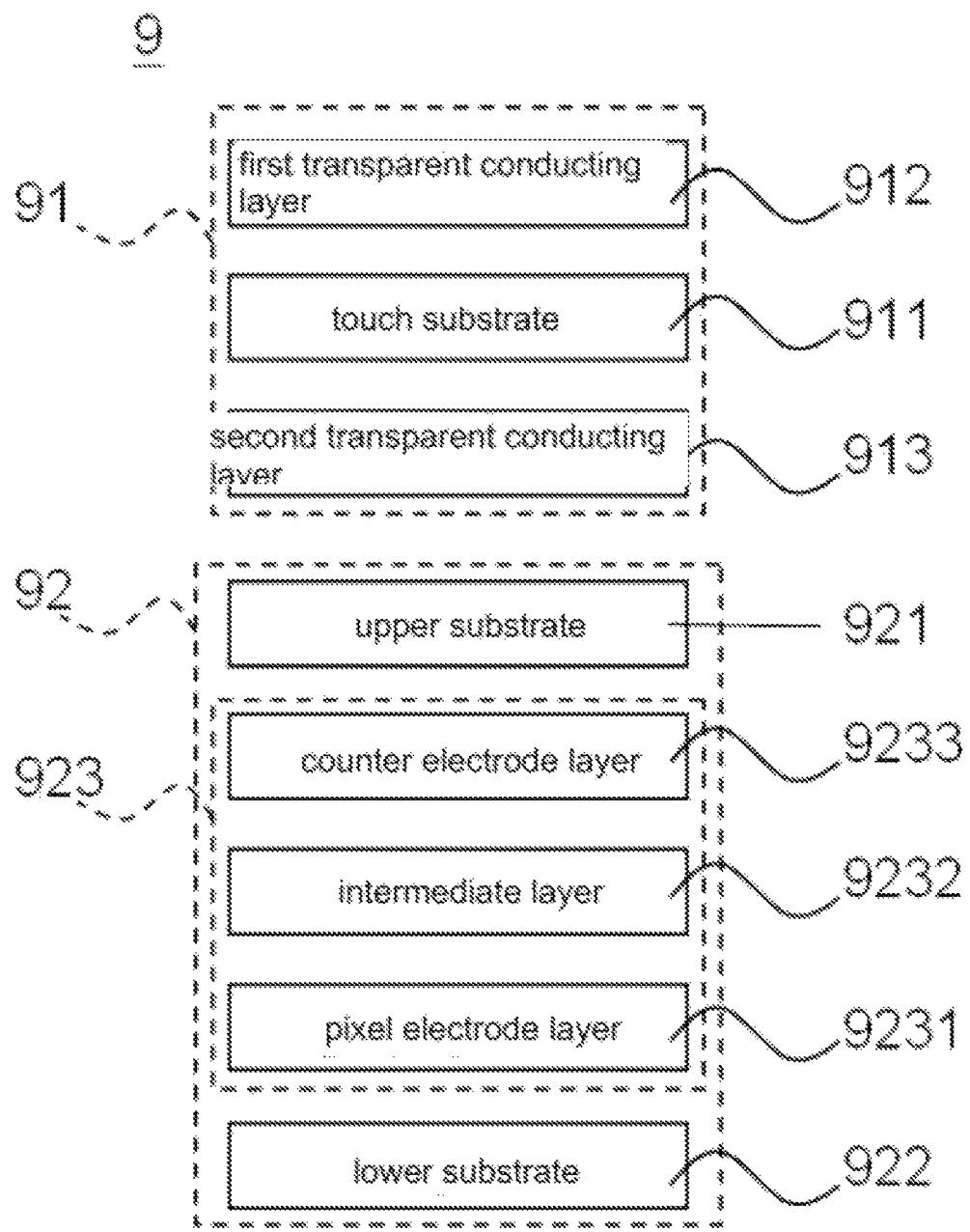
FIG. 1 a schematic structure view of a traditional touch sensitive display.
Figure 9:
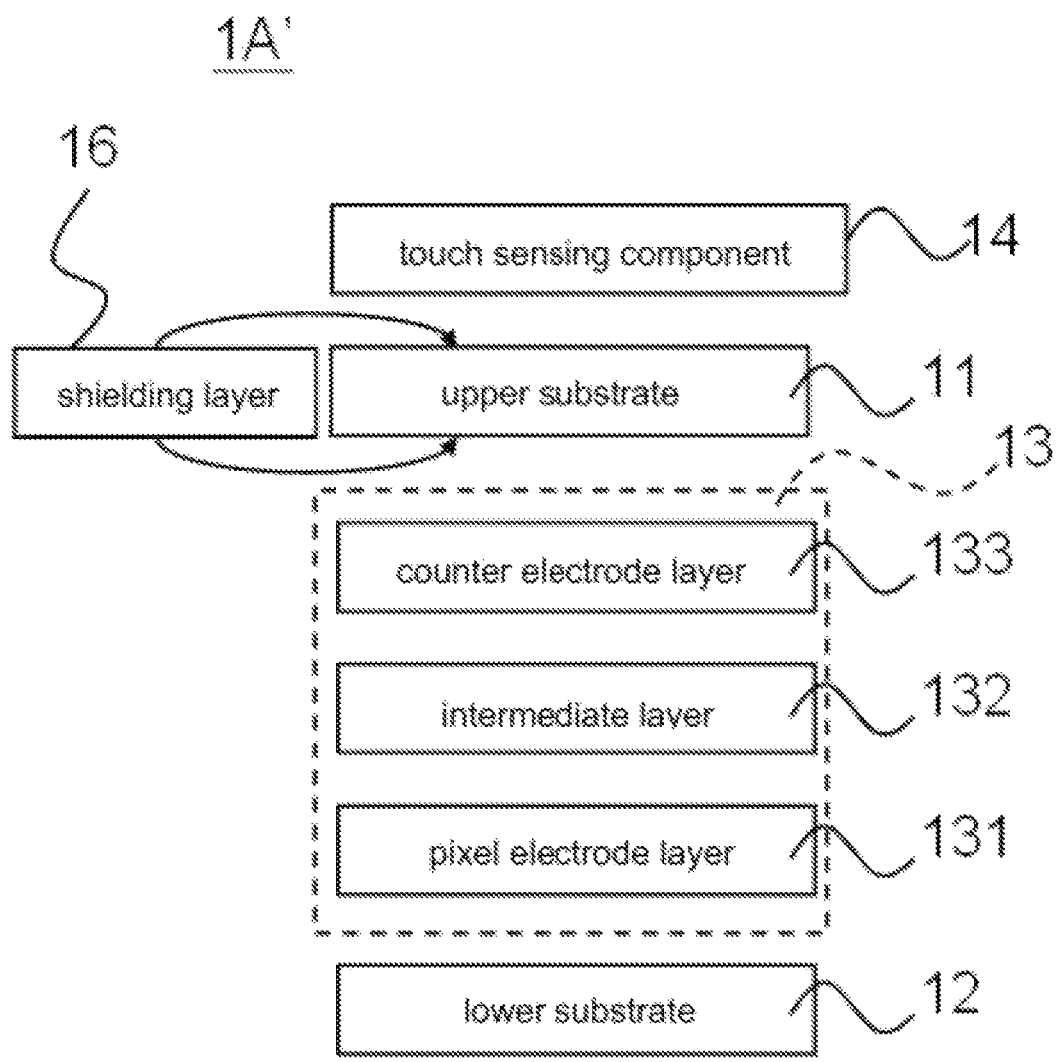
FIG. 9 is a schematic structure view of the touch sensitive display with a shielding layer according to the second embodiment of the present invention.

FIG. 9 shows a schematic structure view of a touch sensitive display 1A' with a shielding layer 16 similar to shielding layer illustrated in FIG. 1A. The touch sensitive display 1A' of the present embodiment further comprises a shielding layer 16 except for the basic structure shown in FIG. 8. The shielding layer 16 can either be disposed under the upper substrate 11, or can be disposed between the upper substrate 11 and the touch sensing component 14, in which case the shielding layer 16 is stacked on the upper side of the upper substrate 11 first, and then the touch sensing component 14 is laminated on the upper side of the shielding layer 16 by an insulation material not shown).

Figure 10:
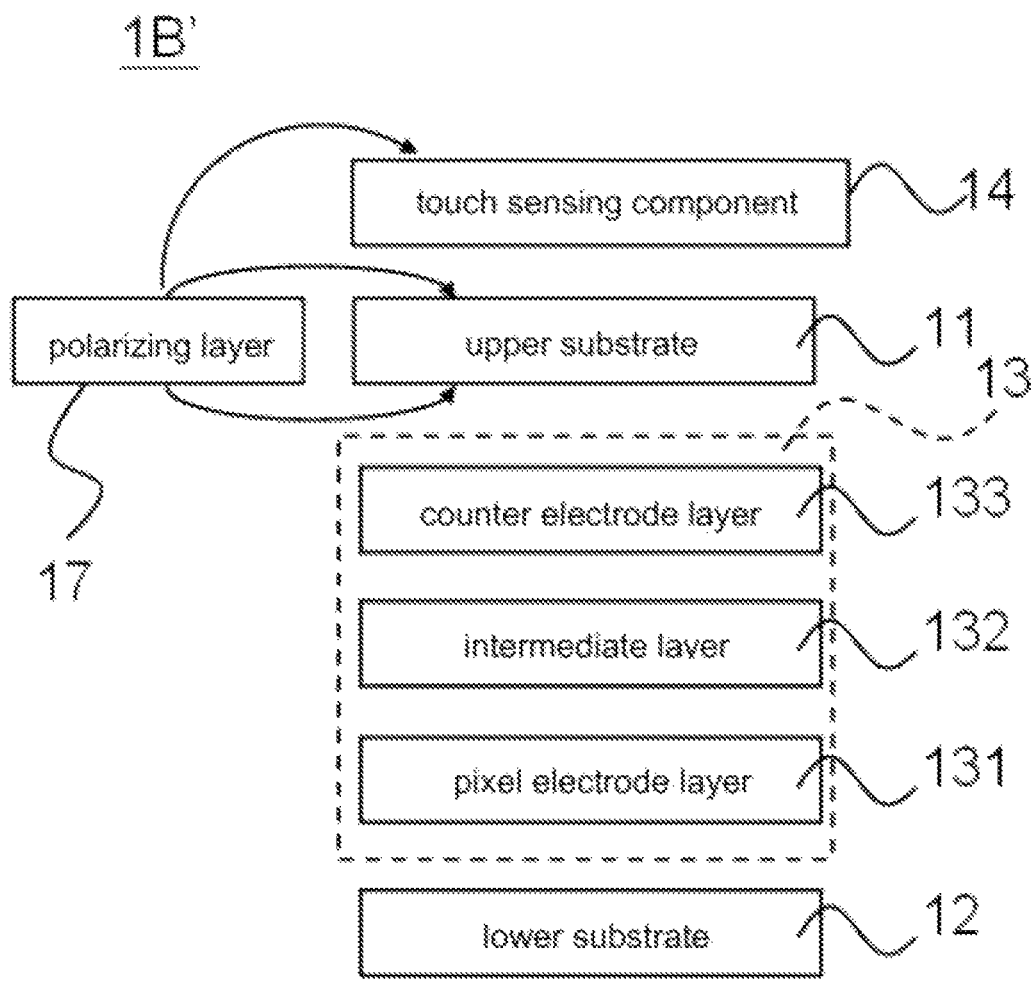
FIG. 10 is a schematic structure view of the touch sensitive display with a polarizing layer according to the second embodiment of the present invention.

FIG. 10 shows a schematic structure view of a touch sensitive display 1B' with a polarizing layer 17 similar to polarizing layer illustrated in FIG. 1B. The touch sensitive display 1B' of the present embodiment further comprises a polarizing layer 17 except for the basic structure shown in FIG. 8. In structure, the polarizing layer 17 can either be disposed under the upper substrate 11, or can be disposed between the upper substrate 11 and the touch sensing component 14, or can be disposed above the touch sensing component 14.

Figure 11:
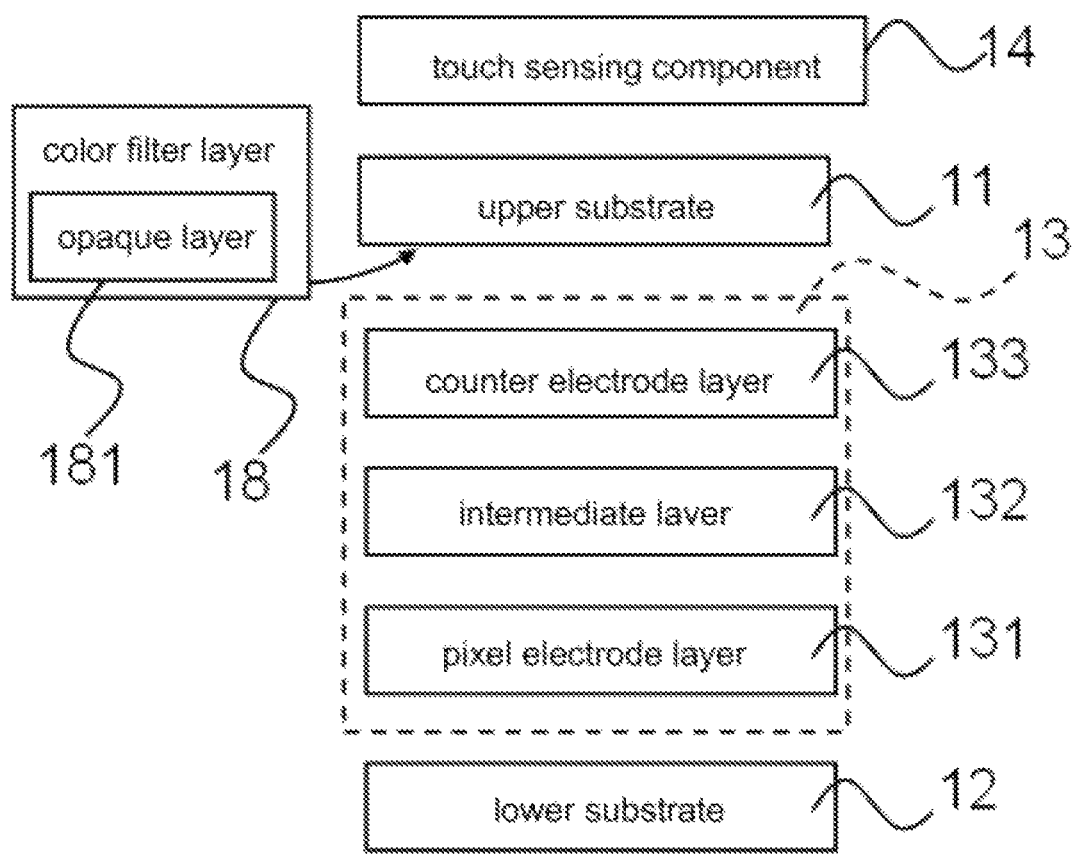
FIG. 11 is a schematic structure view of the touch sensitive display with a color filter layer according to the second embodiment of the present invention.

FIG. 11 shows a schematic structure view of a touch sensitive display 1C' with a color filter layer 18 similar to color filter layer illustrated in FIG. 1C. In an embodiment, if intermediate layer 132 of organic light-emitting component 13 is made from Materials that makes the organic light-emitting component 13 spontaneously emit blue light, the touch sensitive display 1C' further comprises a color filter layer 18. In structure, the color filter layer 18 can be disposed under the upper substrate 11, in which case the color filter layer 18 is directly stacked on the lower side of the upper substrate 11. In addition, an opaque layer 181 of the present embodiment can also be built in the color filter layer 18. However, in the practical design, the opaque layer 181 can also be built in the touch sensing component 14, which is not limited herein.

Figure 12:
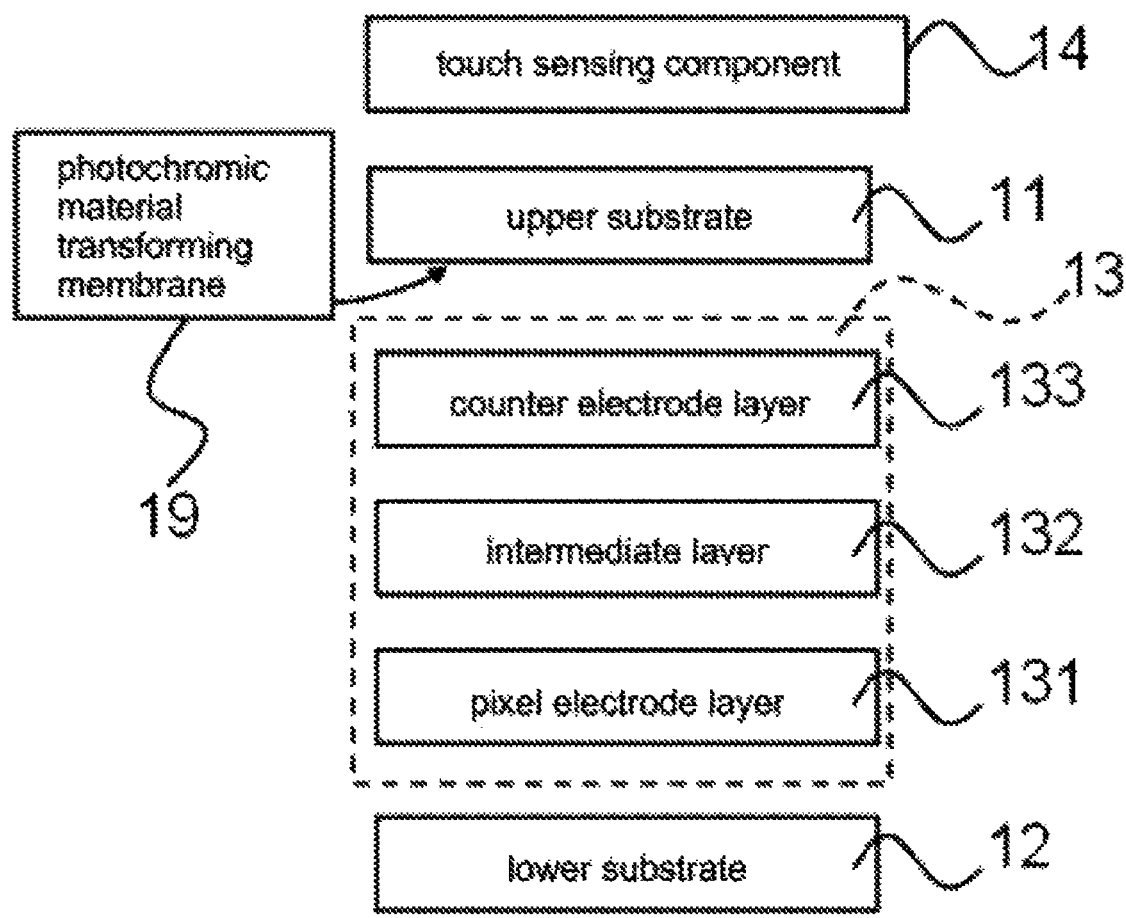
FIG. 12 is a schematic structure view of the touch sensitive display with a photochromic material transforming membrane according to the second embodiment of the present invention.

FIG. 12 shows a schematic structure view of a touch sensitive display 1D' with a photochromic material transforming membrane 19 similar to photochromic material transforming membrane illustrated in FIG. 1D. In an embodiment if intermediate layer 132 of organic light-emitting component 13 is made from materials that makes the organic light-emitting component 13 spontaneously emit blue light, the touch sensitive display 1D' further comprises a photochromic material transforming membrane 19. In structure, the photochromic material transforming membrane 19 can be disposed under the upper substrate 11, in which case the photochromic material transforming membrane 19 is directly stacked on the lower side of the upper substrate 11.

Finally, for explaining again, in view of the functions and the stacked foundations of relative shielding layer 16, polarizing layer 17, color filter layer 18, and photochromic material transforming membrane 19, those skilled in the art can selectively combine those layers to integrate into the touch sensitive display 1' according to the practical design request.

In conclusion, the present invention integrates a touch sensing component having a single layer structure with an organic light-emitting display. The integrated touch sensitive display is lightweight in terms of structure and thereby can be easily and conveniently applied in various environments. Besides, the proposed integrated touch sensitive display efficiently simplifies the whole manufacturing process of the touch sensitive display so as to reduce the production cost.

While certain embodiments have been shown and described, various modifications and substitutions may be made thereon without departing from the spirit and scope of the invention. Accordingly, it is to be understood that the present invention has been described in the way of illustration but not limitations.

The invention claimed is:

1. A touch sensitive display, comprising:
    an upper substrate;
    a lower substrate disposed below the upper substrate;
    an organic light-emitting component disposed above the lower substrate, the organic light-emitting component for emitting a white light;
    a touch sensing component disposed under the upper substrate, wherein the touch sensing component is a single layer structure; and
    a color filter layer, wherein the color filter layer is disposed either under the touch sensing component or disposed between the touch sensing component and the upper substrate, further wherein the color filter layer transforms the white light into red-green-blue color light.

2. The touch sensitive display according to claim 1, wherein the touch sensing component comprises a plurality of sensing electrodes juxtaposed separately, further wherein at least one terminal of each of the plurality of sensing electrode is electrically connected to a wire.

3. The touch sensitive display according to claim 1, further comprising: a shielding layer disposed under the touch sensing component.

4. The touch sensitive display according to claim 1, further comprising: a polarizing layer, wherein the polarizing layer is disposed either above the upper substrate, or disposed between the upper substrate and the touch sensing component, or disposed under the touch sensing component.

5. The touch sensitive display according to claim 4 further comprising:
    a retardation film, disposed on the polarizing layer or integrated into the polarizing layer.

6. The touch sensitive display according to claim 1, wherein the organic light-emitting component further comprises: a pixel electrode layer disposed above the lower substrate; an intermediate layer disposed above the pixel electrode layer; and a counter electrode layer disposed above the intermediate layer.

7. The touch sensitive display according to claim 6, wherein the organic light-emitting component further comprises: a protecting layer disposed either above the counter electrode layer and/or between the pixel electrode layer and the lower substrate.

8. The touch sensitive display according to claim 1, further comprising: an opaque layer built in the color filter layer or in the touch sensing component, for differentiating the red-green-blue color light.

9. The touch sensitive display according to claim 1, wherein the touch sensing component comprises a plurality of trapezoid sensing electrodes juxtaposed separately, and wherein at least one terminal of each of the plurality of trapezoid sensing electrodes is electrically connected to a wire.

10. The touch sensitive display according to claim 1, wherein the touch sensing component comprises a plurality of trapezoid sensing electrodes juxtaposed separately, and wherein two terminals of each of the plurality of trapezoid sensing electrodes are electrically connected to two wires respectively.

11. A touch sensitive display, comprising:
    an upper substrate;
    a lower substrate disposed below the upper substrate;
    an organic light-emitting component disposed above the lower substrate, the organic light-emitting component for emitting a white light;
    a touch sensing component disposed above the upper substrate, wherein the touch sensing component is a single layer structure; and
    a color filter layer, wherein the color filter layer is disposed under the upper substrate for transforming the white light into red-green-blue color light.

12. The touch sensitive display according to claim 11, wherein the touch sensing component comprises a plurality of sensing electrodes juxtaposed separately, further wherein at least one terminal of each of the plurality of sensing electrode is electrically connected to a wire.

13. The touch sensitive display according to claim 11, further comprising: a shielding layer disposed either under the upper substrate or disposed between the upper substrate and the touch sensing component.

14. The touch sensitive display according to claim 11, further comprising: a polarizing layer disposed either under the upper substrate or disposed between the upper substrate and the touch sensing component or disposed above the touch sensing component.

15. The touch sensitive display according to claim 11, wherein the organic light-emitting component further comprises: a pixel electrode layer disposed above the lower substrate; an intermediate layer disposed above the pixel electrode layer; and a counter electrode layer disposed above the intermediate layer.

16. The touch sensitive display according to claim 15, wherein the organic light-emitting component further comprises: a protecting layer disposed either above the counter electrode layer and/or between the pixel electrode layer and the lower substrate.

17. The touch sensitive display according to claim 11, further comprising: an opaque layer built either in the color filter layer or in the touch sensing component for differentiating the red-green-blue color light.

18. A touch sensitive display, comprising:
an upper substrate;
a lower substrate disposed below the upper substrate;
an organic light-emitting component disposed above the lower substrate, the organic light-emitting component for emitting a blue light;
a touch sensing component disposed under the upper substrate, wherein the touch sensing component is a single layer structure; and
a photochromic material transforming membrane disposed either under the touch sensing component or disposed between the touch sensing component and the upper substrate, wherein the photochromic material transforming membrane transforms the blue light into red light and green light.

19. The touch sensitive display according to claim 18, wherein the touch sensing component comprises a plurality of sensing electrodes juxtaposed separately, further wherein at least one terminal of each of the plurality of sensing electrode is electrically connected to a wire.

20. The touch sensitive display according to claim 18, further comprising: a shielding layer disposed under the touch sensing component.

21. The touch sensitive display according to claim 18, further comprising: a polarizing layer, wherein the polarizing layer is disposed either above the upper substrate, or disposed between the upper substrate and the touch sensing component, or disposed under the touch sensing component.

22. The touch sensitive display according to claim 21 further comprising:
a retardation film, disposed on the a polarizing layer or integrated into the polarizing layer.

23. The touch sensitive display according to claim 18, wherein the organic light-emitting component further comprises: a pixel electrode layer disposed above the lower substrate; an intermediate layer disposed above the pixel electrode layer; and a counter electrode layer disposed above the intermediate layer.

24. The touch sensitive display according to claim 23, wherein the organic light-emitting component further comprises: a protecting layer disposed either above the counter electrode layer and/or between the pixel electrode layer and the lower substrate.

25. The touch sensitive display according to claim 18, wherein the touch sensing component comprises a plurality of trapezoid sensing electrodes juxtaposed separately, and wherein at least one terminal of each of the plurality of trapezoid sensing electrodes is electrically connected to a wire or wherein two terminals of each of the plurality of trapezoid sensing electrodes are electrically connected to two wires respectively.

26. A touch sensitive display, comprising:
an upper substrate;
a lower substrate disposed below the upper substrate;
an organic light-emitting component disposed above the lower substrate, the organic light-emitting component for emitting a blue light;
a touch sensing component disposed above the upper substrate, wherein the touch sensing component is a single layer structure; and
a photochromic material transforming membrane disposed either under the touch sensing component or disposed between the touch sensing component and the upper substrate, wherein the photochromic material transforming membrane transforms the blue light into red light and green light.

27. The touch sensitive display according to claim 26, wherein the touch sensing component comprises a plurality of sensing electrodes juxtaposed separately, further wherein at least one terminal of each of the plurality of sensing electrode is electrically connected to a wire.

28. The touch sensitive display according to claim 26, further comprising: a shielding layer disposed either under the upper substrate or disposed between the upper substrate and the touch sensing component.

29. The touch sensitive display according to claim 26, further comprising: a polarizing layer disposed either under the upper substrate or disposed between the upper substrate and the touch sensing component or disposed above the touch sensing component.

30. The touch sensitive display according to claim 26, wherein the organic light-emitting component further comprises: a pixel electrode layer disposed above the lower substrate; an intermediate layer disposed above the pixel electrode layer; and a counter electrode layer disposed above the intermediate layer.

31. The touch sensitive display according to claim 30, wherein the organic light-emitting component further comprises: a protecting layer disposed either above the counter electrode layer and/or between the pixel electrode layer and the lower substrate.

32. The touch sensitive display according to claim 26, further comprising: an opaque layer built either in the color filter layer or in the touch sensing component for differentiating the red-green-blue color light.

* * * * *